(12) United States Patent
Yang et al.

(10) Patent No.: US 11,431,585 B2
(45) Date of Patent: Aug. 30, 2022

(54) METHOD AND SYSTEM FOR EDGE AND NON-EDGE NETWORKS ALLOCATION

(71) Applicant: Verizon Patent and Licensing Inc., Arlington, VA (US)

(72) Inventors: Jin Yang, Orinda, CA (US); Arda Aksu, Lafayette, CA (US); Lalit R. Kotecha, San Ramon, CA (US); Daryl M. Low, San Jose, CA (US); Donna L. Polehn, Mercer Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 118 days.

(21) Appl. No.: 16/595,604

(22) Filed: Oct. 8, 2019

(65) Prior Publication Data

US 2021/0105191 A1 Apr. 8, 2021

(51) Int. Cl.
| | |
|---|---|
| *H04L 41/5009* | (2022.01) |
| *G06F 11/34* | (2006.01) |
| *H04L 43/08* | (2022.01) |
| *H04L 67/1001* | (2022.01) |
| *H04L 43/16* | (2022.01) |

(52) U.S. Cl.
CPC ...... *H04L 41/5009* (2013.01); *G06F 11/3409* (2013.01); *H04L 43/08* (2013.01); *H04L 43/16* (2013.01); *H04L 67/1002* (2013.01)

(58) Field of Classification Search
CPC .................................................. H04L 41/5009
See application file for complete search history.

(56) References Cited

U.S. PATENT DOCUMENTS

| 7,843,843 | B1 * | 11/2010 | Papp, III | H04L 43/00 |
| | | | | 370/252 |
| 2014/0122706 | A1 * | 5/2014 | Boerner | G06F 9/5083 |
| | | | | 709/224 |
| 2017/0317894 | A1 * | 11/2017 | Dao | H04W 28/24 |

\* cited by examiner

*Primary Examiner* — Nicholas P Celani

(57) ABSTRACT

A method, a device, and a non-transitory storage medium are described in which a network allocation service is provided. The network allocation service may use available network resource information of an application service layer network of a first type, such as a multi-access edge computing network, and application service demand information of an application to determine whether a performance metric of the application service would be satisfied. The performance metric may include a threshold service time that includes a processing time associated with a processing of an application service request and response, by the application service layer network, and a transit time associated the application service response from the application service layer network to an end device. The network allocation service may select the first type or a second type of application service layer network depending on the outcome of the determination.

20 Claims, 11 Drawing Sheets

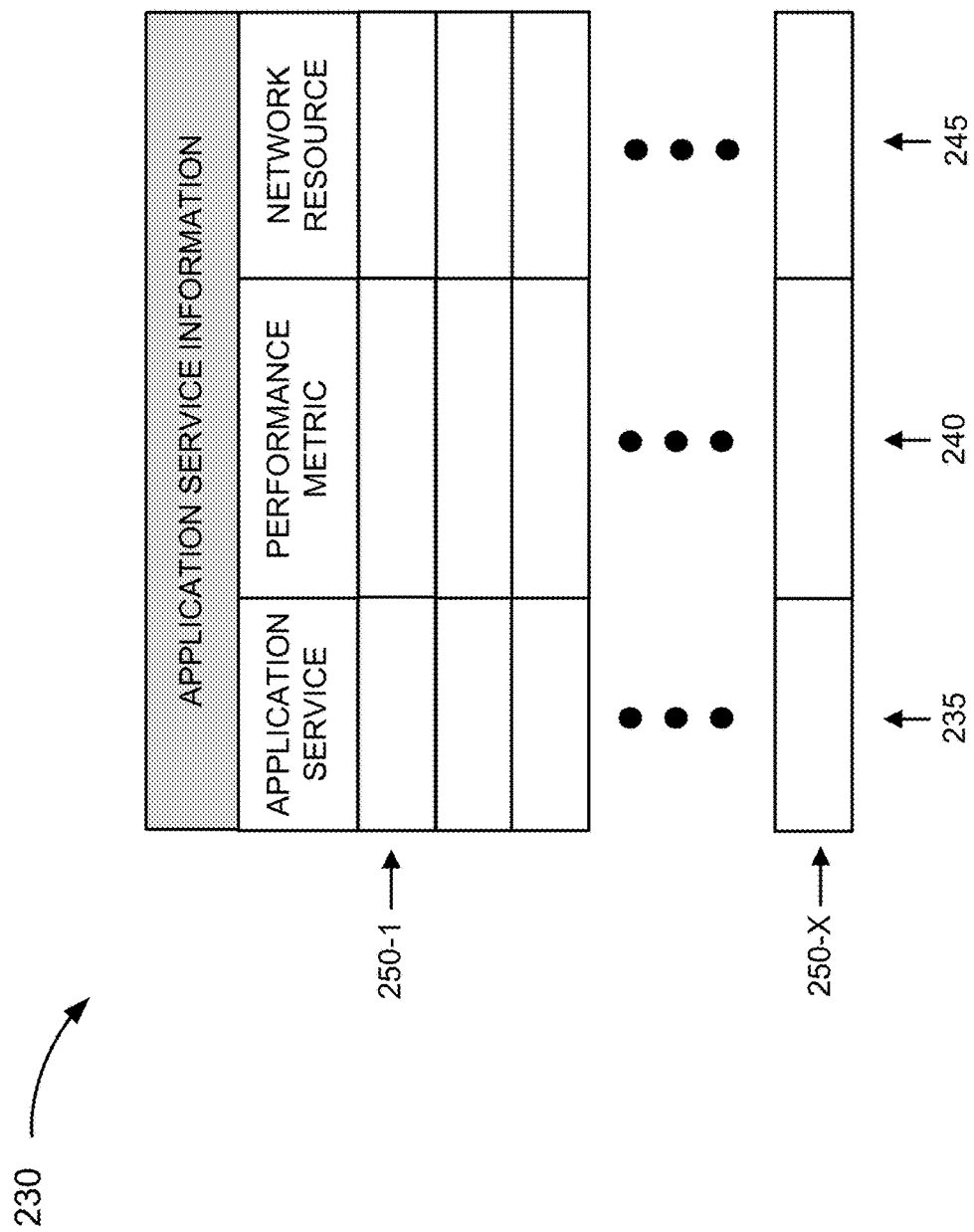

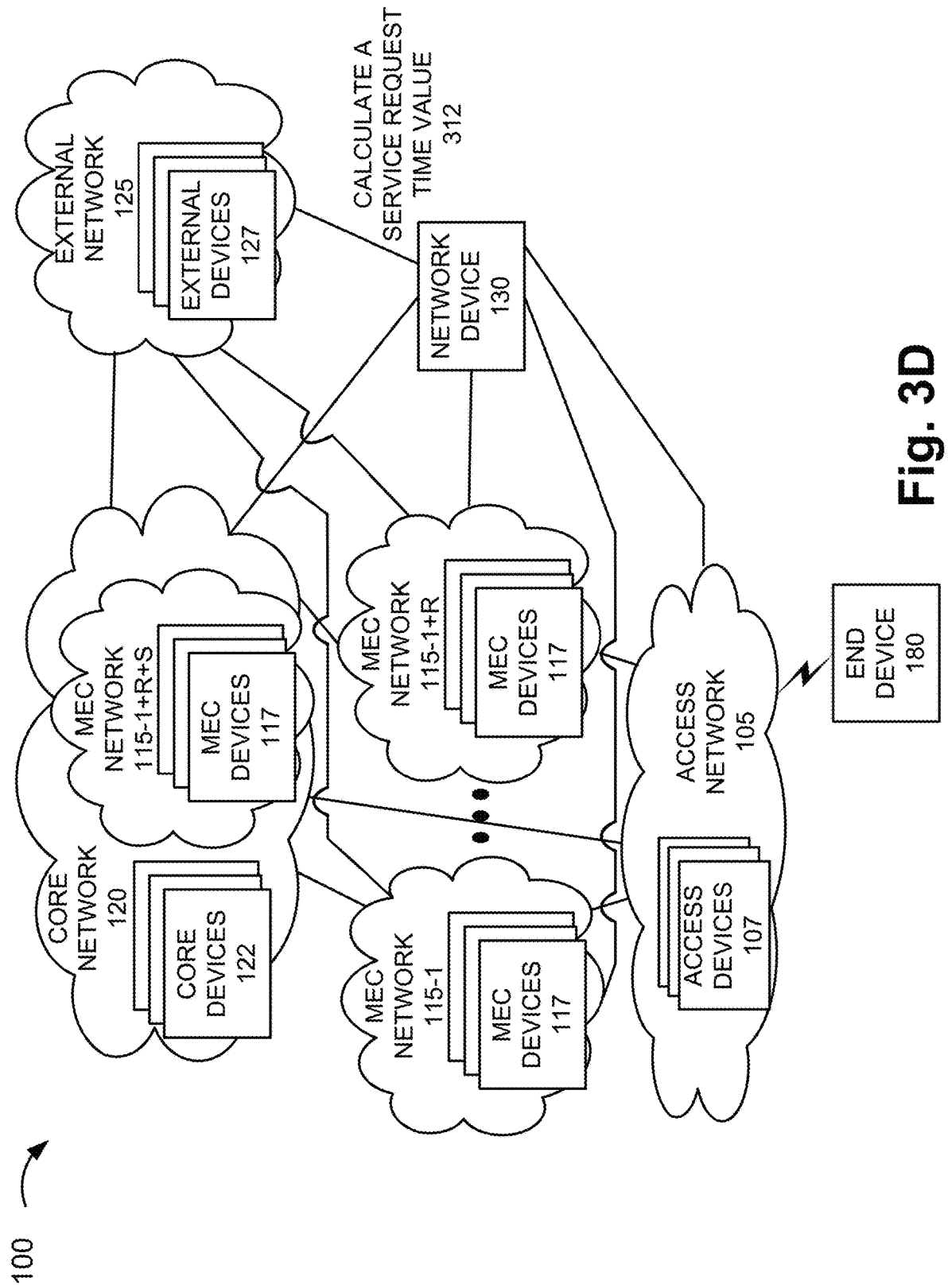

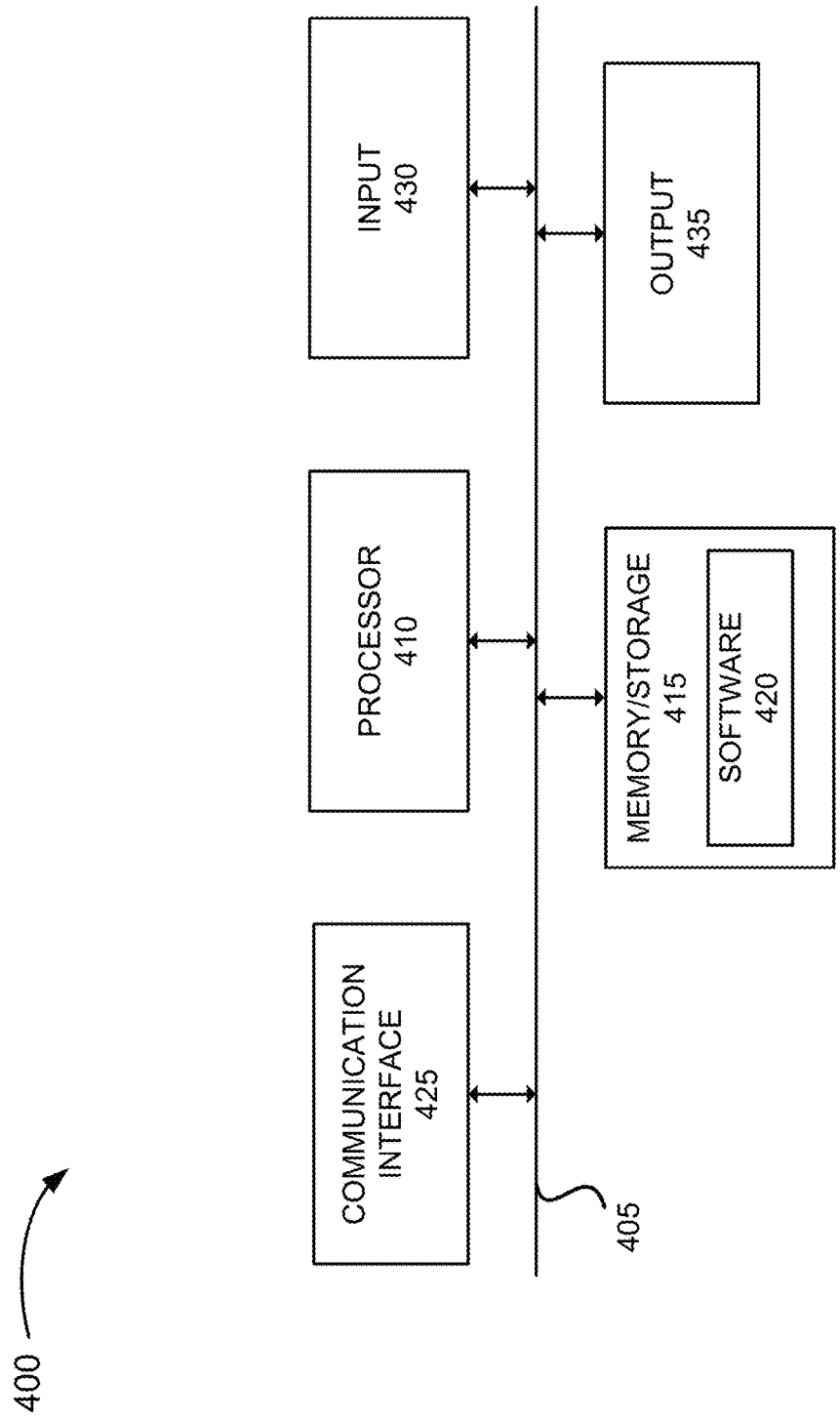

METHOD AND SYSTEM FOR EDGE AND NON-EDGE NETWORKS ALLOCATION

BACKGROUND

Development and design of networks present certain challenges from a network-side perspective and an end device perspective. In order to enhance performance, multi-access edge computing (MEC) (also known as mobile edge computing (MEC)) is being explored in which core network capabilities (e.g., computational, storage, communication links, etc.) are situated at the network edge in order to reduce traffic being sent to the core network and reduce latency amongst other things.

BRIEF DESCRIPTION OF THE DRAWINGS

FIG. 2B is a diagram of exemplary application service information that may used to provide the network allocation service;

FIGS. 3A-3F are diagrams illustrating an exemplary process of an exemplary embodiment of the network allocation service;

FIG. 4 is a diagram illustrating exemplary components of a device that may correspond to one or more of the devices illustrated and described herein.

DETAILED DESCRIPTION OF PREFERRED EMBODIMENTS

Figure 1:
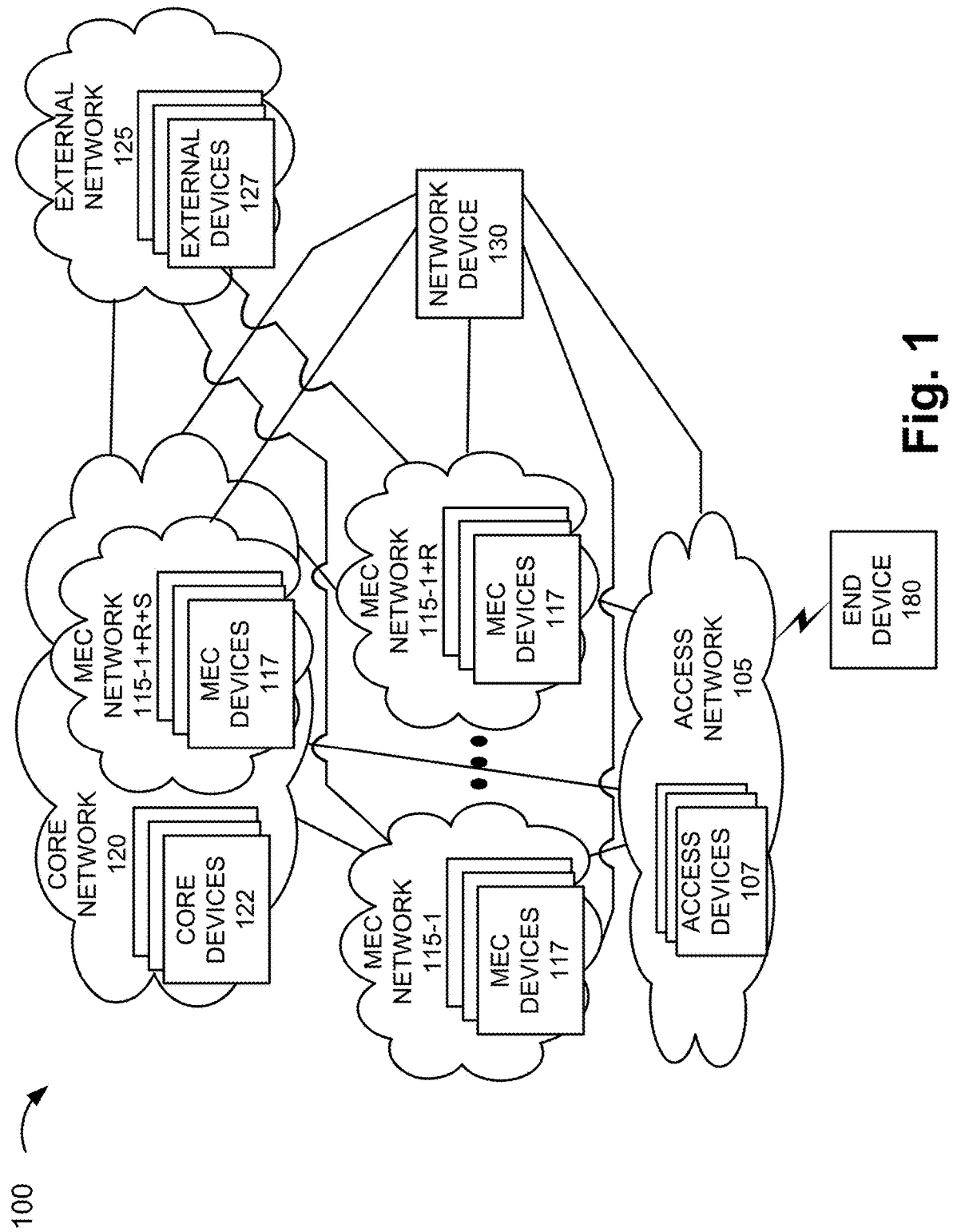
FIG. 1 is a diagram illustrating an exemplary environment in which an exemplary embodiment of a network allocation service may be implemented.

The following detailed description refers to the accompanying drawings. The same reference numbers in different drawings may identify the same or similar elements. Also, the following detailed description does not limit the invention.

MEC networks or other types of end device application or service layer networks (referred to as "application service layer network") that provide an application and/or a service (referred to as an "application service") may not always have sufficient available resources to accommodate all end devices or users at all times. For purposes of description, the application service may include a monolithic application, a microservice, or another type of configurable architecture of an application service. Typically, the MEC network has limited network resources (e.g., physical, logical, virtual) and during various periods of time, the MEC network may have insufficient resources to satisfy requests from the end devices and the users. For example, the insufficient resources may be due to the number of end devices or users being served, the number of applications running simultaneously in the MEC network, the amount of content data involved in relation to the applications (e.g., 3D extreme reality, etc.), the state of the MEC network (e.g., in the process of being reconfigured or upgraded; failures, congestion, etc.), and/or some other reason.

As a result, the MEC network or other types of application service layer networks may be unable to support a level of quality of service (QoS) associated with the application service. For example, the delivery of the application service to an end device may suffer from degradation of various performance metrics, such as latency, error rate, throughput, packet loss, or another type of QoS parameter, key performance indicator (KPI) parameter, and/or service level agreement (SLA) parameter that pertains to an end-to-end flow. Additionally, some users or end devices of the application service may be denied the application service, and other users or end devices may experience intermittent application service. In this regard, for example, the MEC network may not always satisfy the performance metrics of an application service even though the MEC network may yield a shortest route (e.g., in terms of time and not necessarily geographic) from the end device because of degradations of service stemming from insufficient resources. For example, computational, memory, storage, buffer, communication link, and/or other types of network resources may degrade one or multiple performance metrics of the application service. On the other hand, other application service layer networks may yield a farther route from the end device but have sufficient resources and able to satisfy the performance metrics of the application service.

According to exemplary embodiments, a network allocation service is described. According to an exemplary embodiment, the network allocation service may pertain to a MEC network. For example, the network allocation service may determine whether to select or not select a MEC network to satisfy an application service request. According to an exemplary embodiment, the network allocation service may select a non-MEC network when the MEC network is unable to satisfy the application service request. For example, the network allocation service may select another type of application service layer network, such as the Internet, the World Wide Web (WWW), an Internet Protocol Multimedia Subsystem (IMS) network, a Rich Communication Service (RCS) network, a cloud network, a packet-switched network, a data center, a private network, a fog network, or another type of network that hosts an end device application service. According to other exemplary embodiments, the network allocation service may pertain to multiple networks of different types and/or technologies other than the MEC network.

According to an exemplary embodiment, the network allocation service may be implemented in a centralized manner. For example, a network device may govern the selection and allocation of multiple MEC networks for satisfying application service requests in conjunction with a non-MEC network. According to other exemplary embodiments, the network allocation service may be implemented in a distributed fashion.

According to an exemplary embodiment, the network allocation service may obtain real-time and current utilizations pertaining to network resources. For example, hardware, software, and communication link current loads pertaining to a MEC network and an intermediary network between the MEC network and end device may be obtained. According to an exemplary embodiment, the network allocation service may also obtain or store the capacities of network resources so that available resources may be calculated. According to an exemplary embodiment, the network allocation service may also obtain network resource demands of an application service. For example, the network resource demand information may be on a per-application service basis and/or on a per-application service category basis.

According to an exemplary embodiment, the network allocation service uses the utilization, capacity, and application service demand information to determine whether a MEC network or a non-MEC network may satisfy an application service request, as described herein. According to an exemplary embodiment, the network allocation service selects a network that satisfies the performance metrics of the application service. The network allocation service may initiate the provisioning of the selected network to provide the application service, which is responsive to the application service request, based on the determination.

In view of the foregoing, the network allocation service may prevent or minimize unnecessary use of costly network resources in a MEC network or another type of application service layer network, while still satisfying end device demands for the application service.

FIG. 1 is a diagram illustrating an exemplary environment 100 in which an exemplary embodiment of the network allocation service may be implemented. As illustrated, environment 100 includes access network 105, MEC network 115-1 through 115-1+R+S (referred collectively as MEC networks 115; and individually or generally as MEC network 115), a core network 120, and an external network 125. Access network 105 includes access devices 107. MEC network 115 includes MEC devices 117. Core network 120 includes core devices 122. External network 125 includes external devices 127. Environment 100 further includes end devices 180.

The number, type, and arrangement of networks illustrated in environment 100 are exemplary. For example, according to other exemplary embodiments, environment 100 may include an additional and/or different application service layer network that may or may not be subject to the network allocation service. Additionally, or alternatively, other networks not illustrated in FIG. 1 may be included, such as a backhaul/fronthaul network or another type of intermediary network, as described herein.

The number, the type, and the arrangement of network devices, and the number of end devices 180 are exemplary. A network device, a network element, or a network function (referred to herein simply as a network device) may be implemented according to one or multiple network architectures, such as a client device, a server device, a peer device, a proxy device, a cloud device, a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.).

Environment 100 includes communication links between the networks, between the network devices, and between end devices 180 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the network allocation service may use at least one of these planes of communication. Additionally, an interface of a network device may be modified (e.g., relative to an interface defined by a standards body, such as Third Generation Partnership Project (3GPP), International Telecommunication Union (ITU), European Telecommunications Standards Institute (ETSI), etc.) in order to support the communication (e.g., transmission and reception of messages, information elements (IE), attribute value pairs (AVPs), etc.) between network devices and the network allocation service, as described herein. According to various exemplary implementations, the interface may be a service-based interface or a reference point-based interface.

Access network 105 may include one or multiple networks of one or multiple types and technologies. For example, access network 105 may be implemented to include a Fourth Generation (4G) radio access network (RAN) (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, a next generation RAN (e.g., a Fifth Generation (5G)-access network (5G-AN) or a 5G-RAN (referred to herein as simply a 5G-RAN)), another type of future generation RAN, and/or another type of RAN (e.g., a legacy Third Generation (3G) RAN, etc.). Access network 105 may communicate with other types of access networks, such as, for example, a WiFi network, a Worldwide Interoperability for Microwave Access (WiMAX) network, a local area network (LAN), a Citizens Broadband Radio System (CBRS) network, a cloud RAN, a wired network (e.g., optical, cable, etc.), an optical network, or another type of network that provides access to or can be used as an on-ramp to access network 105, MEC network 115, and/or core network 120.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

According to some exemplary embodiments, access network 105 may be implemented to include various architectures of wireless service, such as, for example, macrocell, microcell, femtocell, picocell, metrocell, new radio (NR) cell, LTE cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 Gigahertz (GHz), above 6 GHz, licensed radio spectrum, unlicensed radio spectrum, etc.), and/or other attributes or technologies used for radio communication.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a CU, a DU, a small cell node (e.g., a picocell device, a femtocell device, a microcell device, a home eNB, etc.), a future generation wireless access device, another type of wireless node (e.g., a WiFi device, a WiMax device, a hotspot device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. Additionally, or alternatively, access devices 110 may include wired and/or optical devices (e.g., modem, wired access point, optical access point, Ethernet device, etc.) that provide network access.

MEC network 115 includes a platform that provides an application service. As illustrated, MEC network 115 may be located at an edge of a network, such as access network 105, or co-located with another type of network, such as core network 120 or external network 125. Alternatively, MEC network 115 may not be co-located. MEC network 115 may be implemented using one or multiple technologies including, for example, network function virtualization (NFV), containers, SDN, cloud computing, Infrastructure-as-a-Service (IaaS), Platform-as-a-Service (PaaS), Software-as-a-Service (SaaS), or another type of network technology.

Depending on the implementation, MEC network 115 may include various types of network devices that are illustrated in FIG. 1 as MEC devices 117. For example, MEC devices 117 may include virtual network devices (e.g., virtualized network functions (VNFs), servers, hosts, containers, hypervisors, virtual machines, network function virtualization infrastructure (NFVI), and/or other types of virtualization elements, layers, hardware resources, operating systems, engines, etc.) and associated applications services for use by end devices 180. The application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, and/or other types of mobile edge application services.

Additionally, depending on the implementation, MEC devices 117 may include other types of network devices, such as an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, and/or other types of network devices (e.g., routers, core devices 122, an ingress device, a load balancer, etc.), and network resources (e.g., storage devices, communication links, etc.).

Core network 120 may include one or multiple networks of one or multiple network types and technologies. Core network 120 may include a complementary network of access network 105. For example, core network 120 may be implemented to include an Evolved Packet Core (EPC) of an LTE, an LTE-A, an LTE-A Pro, a next generation core (NGC) network, and/or a future generation core network. Core network 150 may include a legacy core network.

Depending on the implementation of core network 120, core network 120 may include various types of network devices that are illustrated in FIG. 1 as core devices 122. For example, core devices 122 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a network exposure function (NEF), a policy control function (PCF), a network data analytics function (NWDAF), and/or an application function (AF). According to other exemplary implementations, core network 120 may include additional, different, and/or fewer network devices than those described. For example, core devices 122 may include a non-standard and/or a proprietary network device, or another type of network device that may be well-known but not particularly mentioned herein.

External network 125 may include one or multiple networks of one or multiple network types and technologies. For example, external network 125 may be implemented to include an application service layer network, such as the Internet, the Web, an IMS network, an RCS network, a cloud network, a packet-switched network, a data center, a private network, or other type of network that hosts an end device application service. According to some exemplary embodiments, although not illustrated, external network 125 may include MEC network 115 and MEC devices 117. According to such an embodiment, network device 130 may communicate with this MEC network 115 and may be subject to the network allocation service, as described herein.

Depending on the implementation of external network 125, external network 125 may include various network devices depicted in FIG. 1 as network devices 127. For example, network devices 127 may provide various applications, services, or another type of end device asset, such as a server (e.g., web, application, cloud, etc.), mass storage device, data center devices, routers, and/or other types of network devices pertaining to various network-related functions.

Network device 130 may include logic that provides the network allocation service. Network device 130 may use network resource information and application service information as a basis to determine whether a service request is serviced by a MEC network and if so, which MEC network. Otherwise, if the service request is not to be serviced by the MEC network, network device 130 may select a non-MEC network to service the service request. According to an exemplary embodiment, as described herein, network device 130 may estimate end-to-end metrics for a MEC network. For example, the end-to-end metrics may include an estimation of a processing metric pertaining to the application service at the MEC network (e.g., an edge server or other type of MEC device 117), such as processing time for the service request, and an estimation of a transit time, such as the transmission and propagation of an application service message to the end device. According to other examples, the end-to-end metrics may include a different division for providing a response to the service request to the end device.

Figure 2A:
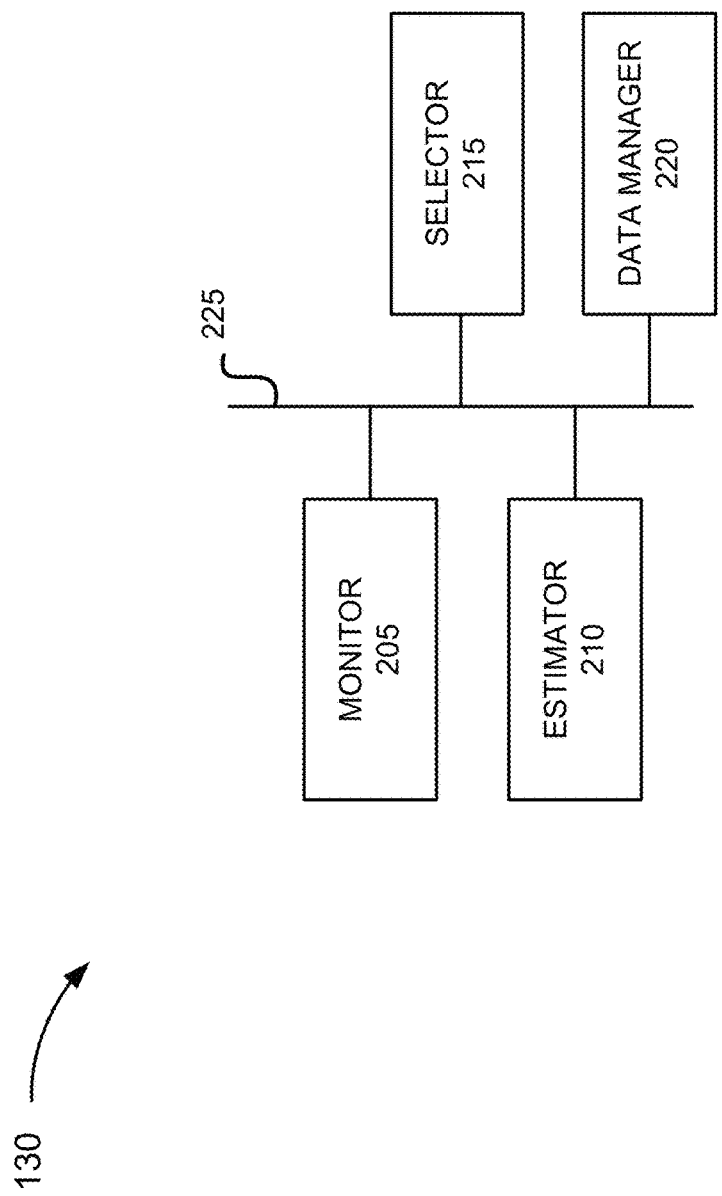
FIG. 2A is a diagram illustrating exemplary components of an exemplary embodiment of the network device depicted in FIG. 1 that provides the network allocation service.

FIG. 2A is a diagram illustrating exemplary components of an exemplary embodiment of network device 130. As illustrated, network device 130 may include a monitor 205, an estimator 210, a selector 215, a data manager 220, and a link 225. According to other exemplary embodiments, network device 130 may include additional, fewer, and/or different components. For example, network device 130 may not include data manager 220, but may access and use an external network device that stores information, as described herein.

Monitor 205 may include logic that obtains network resource information pertaining to an application service layer network. For example, monitor 205 may obtain network resource information pertaining to MEC networks 115. The network resource information may include network resource utilization data that indicates the load of network resources relative to total network resource capacity. Additionally, or alternatively, the network resource information may include the amount of available network resources. The network resource information may also include a network identifier (e.g., a MEC identifier) and/or another type of identifier that may identify a portion of the MEC network (e.g., a cluster of MEC servers, which may be allocated to provide a category of an application service, from among other clusters that provide other categories of application services, etc.) to which the network resource information pertains.

According to various exemplary implementations, monitor 205 may obtain the network resource information from an edge server (e.g., e.g., a virtualized network functions (VNFs), server, a host device, a virtual machine, etc. that provides an application service for an end device 180), an edge server controller (e.g., virtualized infrastructure manager (VIM), a virtual network function manager (VNFM), an ME platform manager, a Generic Virtual Network Function Manager (GVNFM), a Specialized Virtual Network Function Manager (SVNFM), etc.), and/or another type of MEC device 117 (e.g., a network performance or monitoring device, etc.) situated in MEC network 115.

The network resource utilization data may include resource utilization parameters and values pertaining to various types of physical resources (e.g., a processor, a storage device, a communication interface, a memory, a buffer, a communication link (e.g., wired, wireless, etc.), logical resources, and/or virtual resources. The network allocation service may calculate or obtain a resource usage value (e.g., used resources/available, a percentage (e.g., 50%, etc.), etc.) pertaining to the network resource based on the monitoring. The logical resources may be a partition of a physical resource dedicated to or allocated to, for example, a MEC device 117 or shared between MEC devices 117. The virtual resources may be an abstraction of physical and/or logical resources.

According to some exemplary embodiments, the network resource utilization data may be application-specific, application category-specific, and/or server or device specific. For example, a MEC server that is executing an application service, the network resource utilization data may be correlated to the application service. Since resource utilization varies over time, the utilization value may represent a level of resource utilization over a time period. According to an exemplary implementation, the resource usage value may be an average value of resource utilization over time. According to other exemplary implementations, the resource usage value may include multiple values (e.g., high, low, and average).

Similarly, network resource availability data may include parameters and values pertaining to various types of physical, logical and/or virtual resources that are available for use (e.g., capacity minus load). The network resource information may indicate other types of network state data, such as congestion indication data (e.g., notification of congestion, data indicating invocation of congestion avoidance, etc.), failure data (e.g., a device failure, a link failure, a power failure, etc.), or other types of network state data (e.g., data pertaining to network performance metrics, such as latency, etc.).

Monitor 205 may obtain network resource information pertaining to other networks (e.g., access network 105, core network 120, etc.) and communication links that are a part of a network path between MEC network 115 and end device 180.

According to some exemplary embodiments, monitor 205 may obtain current network performance metric information pertaining to MEC networks 115. For example, various types of performance metrics (e.g., latency, etc.), as described herein, may be obtained. According to an exemplary embodiment, the current network performance information may be application-specific, application category-specific, and/or server or device specific. Similarly, monitor 205 may obtain current network performance metric information pertaining to intermediary networks (e.g., access network 105, core network 120, etc.) and communication links that are a part of a network path between MEC network 115 and end device 180.

Estimator 210 may include logic that calculates an estimated time for an application service response to be provided to end device 180 based on the network resource information and application service information, as described herein. For example, estimator 210 may calculate a time period for a target resource (e.g., an edge server of a MEC network 115 that provides a requested application service) to process a request of an application service and for a response of the application service to propagate via a network path to end device 180. By way of further example, an estimated processing time may be calculated based on the following exemplary expression:

$$PE \sim PC - (CD + ASPD) \qquad (1),$$

in which a processing estimated (PE) value may be calculated based on a processing capability (PC) value, a current demand (CD) value, and an application service processing demand (ASPD) value. The processing estimated value may pertain to a particular MEC network 115, a particular MEC server of MEC network 115, or both. According to another exemplary implementation, the processing estimated value may be calculated according to a different expression. For example, an estimated processing time may be calculated based on the following exemplary expression:

$$PE \sim AR - ASPD \qquad (2),$$

in which an available resource (AR) value, which may indicate the amount of available processing resources, may be calculated, and the application service processing demand (ASPD) value may be subtracted from the available processing value.

According to some exemplary implementations, estimator 210 may store or have access to network resource capability information pertaining to various network resources of MEC network 115. For example, the total physical available resources may be generally static. For example, the network resource capability information may include the total physical resources available in MEC network 115, the total physical resources of a MEC server, and/or a cluster of MEC servers. By way of further example, the processing capability value may indicate the total processing capabilities of a processor of a MEC server in relation to a request (e.g., an application service request from end device 180 or another device). The processing capability value may indicate the total number of instructions that may be executed for a particular instruction set over a time period (e.g., instructions/per second or other unit of measurement), bus capacity and speed, cache capacity, and/or other characteristics related to the processor (and other physical resources, such as storage, etc.) used at the MEC server to provide the application service. Logical and/or virtual resources may be more dynamic in nature. Accordingly, in some exemplary implementations, the network resource information may include the network resource capability information. For example, the network resource capability information may indicate a maximum number of host devices and/or virtual entities (e.g., virtual machines, containers, etc.) that may run an application service or a category of an application service.

The current demand value may indicate the current demand associated with the various network resources of MEC network 115. For example, the current demand value may indicate a current processing demand, such as the current number of instructions that are executed over a time period by the processor of the MEC server. The current demand value may be extracted and/or calculated based on the network resource information obtained from monitor 205. The application service processing demand value may be calculated or extracted from the application service information, as described herein. For example, the application service processing demand value may indicate the processing demand (e.g., load) of the application service that may occur during an application service session at a MEC server and potentially other network resources in MEC network 115. The network resource information may include current demand associated with host devices and/or virtual entities, such as the number of host devices and/or virtual entities currently running the application service or the category of the application service.

Additionally, as previously described, estimator 210 may calculate an estimated transit time for an application service response to propagate via a network path to end device 180. By way of further example, estimator 210 may calculate the estimated transit time based on the following exemplary expression:

$$TE \sim TC - (CD + ASTD) \qquad (3),$$

in which a transit estimated (TE) value may be calculated based on a transit capability (TC) value of a network path, a current demand (CD) value, and an application service transit demand (ASTD) value. For example, the transit estimated value may pertain to a particular network path between a MEC server of MEC network 115 and end device 180. The network path may include, for example, communication links and network devices of access network 105 or access network 105 and core network 120. The current demand value may indicate the current load associated with the network path. The application service transit demand value may indicate a transit demand (e.g., load) of the application service that may occur during an application service session. For example, application service transit demand value may be based on a payload size of an application service message (e.g., a packet, etc.), the frequency of transmission of application service messages (e.g., intermittent, continuous, burst, etc.), and the number of application service messages to be transmitted.

According to another exemplary implementation, the transit estimated value may be calculated according to a different expression. For example, the transit estimated (TE) value may be calculated according to the following exemplary expression:

$$TE \sim AT - ASTD \qquad (4),$$

in which an available transit (AT) value, which may indicate the amount of available transit resources, may be calculated, and the application service transit demand (ASTD) value may be subtracted from the available transit value.

Estimator 210 may store or have access to network resource capability information pertaining to access network 105 and core network 120 from which the transit capability value may be extracted or calculated. Additionally, estimator 210 may extract or calculate the current demand value of a network path based on the network resource information obtained from monitor 205. The applicant service transit demand value may be calculated or extracted from the application service information, as described herein. For example, the application service transit demand value may indicate the transit demand (e.g., load) of the application service that may occur during an application service session.

Estimator 210 may calculate an estimated service response value based on the estimated processing and communication values. For example, estimator 210 may calculate an estimated service time (EST) value based on the following exemplary expression:

$$EST \sim PE + TE \qquad (5),$$

in which the estimated service time (EST) value may indicate an estimated total time for end device to receive an application service response, which is responsive to an application service request.

Although the exemplary expressions (1) through (5) may relate to a time factor in relation to the estimation of providing an application service to end device 180, according to other embodiments, estimator 210 may calculate values indicative of other attributes pertaining to the provisioning of the application service and/or relate to various performance metrics of the application service, as described herein.

According to some exemplary embodiments, estimator 210 may identify MEC networks 115 and/or MEC servers currently providing the requested application service or category of the application service, and use their correlated current network performance information to generate an estimated service time value (e.g., processing time and transit time). Estimator 210 may also consider network resource information pertaining to the MEC networks and/or MEC servers currently providing the requested application service or category of the application service. For example, a MEC server that provides the application service in view of an identified load and/or available amount of network resources may be used as a basis to estimate the service time value for other MEC servers that are providing the application service with prospective loads (e.g., current loads and a prospective application service load associated with servicing the application service request) and/or prospective available amount of network resources (e.g., current available network resources minus prospective available amount of network resource associated with servicing the application service request).

Additionally, for example, estimator 210 may use historical network performance information, historical network resource information, and application service information to calculate an estimated service time value. For example, historical network performance and network resource information of MEC servers that are similarly configured in one or multiple MEC networks 115 may be used to estimate a processing time value. Similarly, historical network performance and network resource information of intermediary networks may be used to estimate a transit time value.

Selector 215 may include logic that determines whether one or multiple candidate MEC networks 115 and/or MEC servers satisfy the performance metric and network resource requirements of the application service that pertains to an application service request. For example, selector 215 may compare the calculated estimated service time and/or other values (e.g., PE, TE) provided by estimator 210 to determine whether a MEC server of a MEC network 115 satisfies a performance metric and network resource requirements based on a comparison or analysis relative to the application service information. Selector 215 may include logic that load balances the selection of a MEC server when multiple candidate MEC networks 115 and/or MEC servers satisfy the application service information. Selector 215 may consider other factors in the selection of the MEC network 115 and/or MEC server, such as least cost for provisioning (e.g., creating a new virtual machine or use an existing virtual machine), geographical location relative to end device 180, and/or other network policy or rule-based considerations.

Selector 215 may further include logic that when there are no candidate MEC networks 115 and/or MEC servers to select from, selector 215 may determine that the application service request be serviced by a non-MEC network. Selector 215 may inform one or multiple network devices of its decision regarding the selected network. For example, selector 215 may inform a MEC network 115, a non-MEC network, a core device 122 (e.g., an SMF), an access device (e.g., a CU-CP device), and/or other types of network devices. The selected network may subsequently provide the application responsive to the application request.

Data manager 220 may include logic that provides an ingestion service that ingests, stores, and manages various types of data in support of the network allocation service. For example, data manager 220 may include a database management system (DBMS). The DBMS may be implemented using conventional, well-known, or commercially available relational or No Structured Query Language (NoSQL) software/packages (e.g., Microsoft SQL, Oracle Database, Cassandra, MongoDB, etc.). Alternatively, data manager 220 may include another type of data management system. Network device 130 may include a mass storage device. Data manager 220 may include logic that performs other storage-related and/or data management-related functions, such as, formatting data (e.g., transforming raw data into a particular format, etc.), compression and decompression, data integrity verification, adding data, deleting data, updating data, maintaining data quality, providing data access, extraction, encryption, classification of data, etc., for a database or another type of data structure.

FIG. 2B is a diagram of exemplary application service information that may be stored in a table 230. As illustrated, table 230 may include an application service field 235, a performance metric field 240, and a network resource field 245. As further illustrated, table 230 includes records 250-1 through 250-X (also referred to as records 250, or individually or generally as record 250) that each includes a grouping of fields 235, 240, and 245. Application service information is illustrated in tabular form merely for the sake of description. In this regard, application service information may be implemented in a data structure different from a table.

Application service field 235 may store data indicating an application service. For example, application service field 235 may store an identifier that identifies an application service (e.g., X application service, Y application service, Z microservice, etc.) or a category of an application service (e.g., IoT application service, a real-time (RT) application service, an ultra reliable low latency communication (URLLC) application service, an enhanced mobile broadband (EMBB) application service, a mission critical (MC) application service, a massive machine-type communication (mMTC) application service, an over-the-top (OTT) application service, or some other category or type of application service).

Performance metric field 240 may store data indicating one or multiple threshold performance metric values pertaining to the application service identified in application service field 235. For example, performance metric field 240 may store one or multiple threshold parameters and values pertaining to a QoS, a KPI, and/or an SLA requirement in relation to an uplink and/or downlink direction, end-to-end, and so forth. By way of further example, the threshold performance metric value may include latency, error rate, throughput, packet loss (e.g., uplink, downlink), guaranteed flow bit rate (GFBR), maximum flow bit rate (MFBR), session aggregate maximum bit rate (Session-AMBR), a 5G QoS Identifier (5GQI), guaranteed bit rate (GBR), non-GBR, required capacity (e.g., lower and upper limits), response time from application service, reaction and resolution times, availability requirements, and/or another type of threshold performance metric parameter and value.

Network resource field 245 may store data indicating a network resource requirement pertaining to the application service. For example, the data may indicate minimum processing requirements related to various network resources (e.g., processor, storage, memory, etc.) that may be used to execute the application service. Additionally, the minimum processing requirements may indicate a particular type of processor (e.g., a generation, a number of cores, a type (e.g., a graphical processing unit (GPU) versus application-specific, etc.)) and/or other type of physical resource (e.g., memory, etc.) or other type of resource (e.g., logical, virtual). Additionally, network resource field 245 may store data indicating various loads of the application service, such as a processing load, a transit load, and/or another type of load that may be attributed to the execution of the application service on a network device (e.g., a MEC server) and the communication between the network device and an end device 180 via an intermediary network, communication links, and so forth relating to an application service messages.

According to other exemplary implementations, table 230 may store additional, fewer, and/or different instances of application service information in support of the network allocation service, as described herein. For example, application service information may indicate preference information pertaining to an application service, such as the type of network (e.g., MEC network versus Internet, etc.) on which to be executed, or some other type of preference (e.g., virtualization technology, etc.).

Referring back to FIG. 2A, link 225 may provide a communicative link between two or more components in which data may be communicated. For example, link 225 may be implemented as a hardware link (e.g., a bus, a shared memory space, etc.), a software link (e.g., inter-process communication (IPC), etc.) or some other type of communicative link (e.g., an application programming interface (API), etc.).

Referring back to FIG. 1, end device 180 includes a device that has computational and communication capabilities (e.g., wireless, wired, optical, etc.). End device 180 may be implemented as a mobile device, a portable device, a stationary device (e.g., a non-mobile device), a device operated by a user, or a device not operated by a user. For example, end device 180 may be implemented as a Mobile Broadband device, a smartphone, a computer, a tablet, a netbook, a phablet, a wearable device (e.g., a watch, glasses, a visor, etc.), a vehicle support system, an Internet of Things (IoT) device, a user device, an autonomous device, a smart device, a drone, customer premise equipment (e.g., a set top box, etc.), a streaming player device, a global positioning device, a game system, a music playing system, or some other type of wireless, wired, and/or optical end device. According to various exemplary embodiments, end device 180 may be configured to execute various types of software (e.g., applications, programs, etc.). The number and the types of software may vary among end devices 180.

End device 180 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, end device 180 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 180 may vary among end devices 180.

Figure 3A:
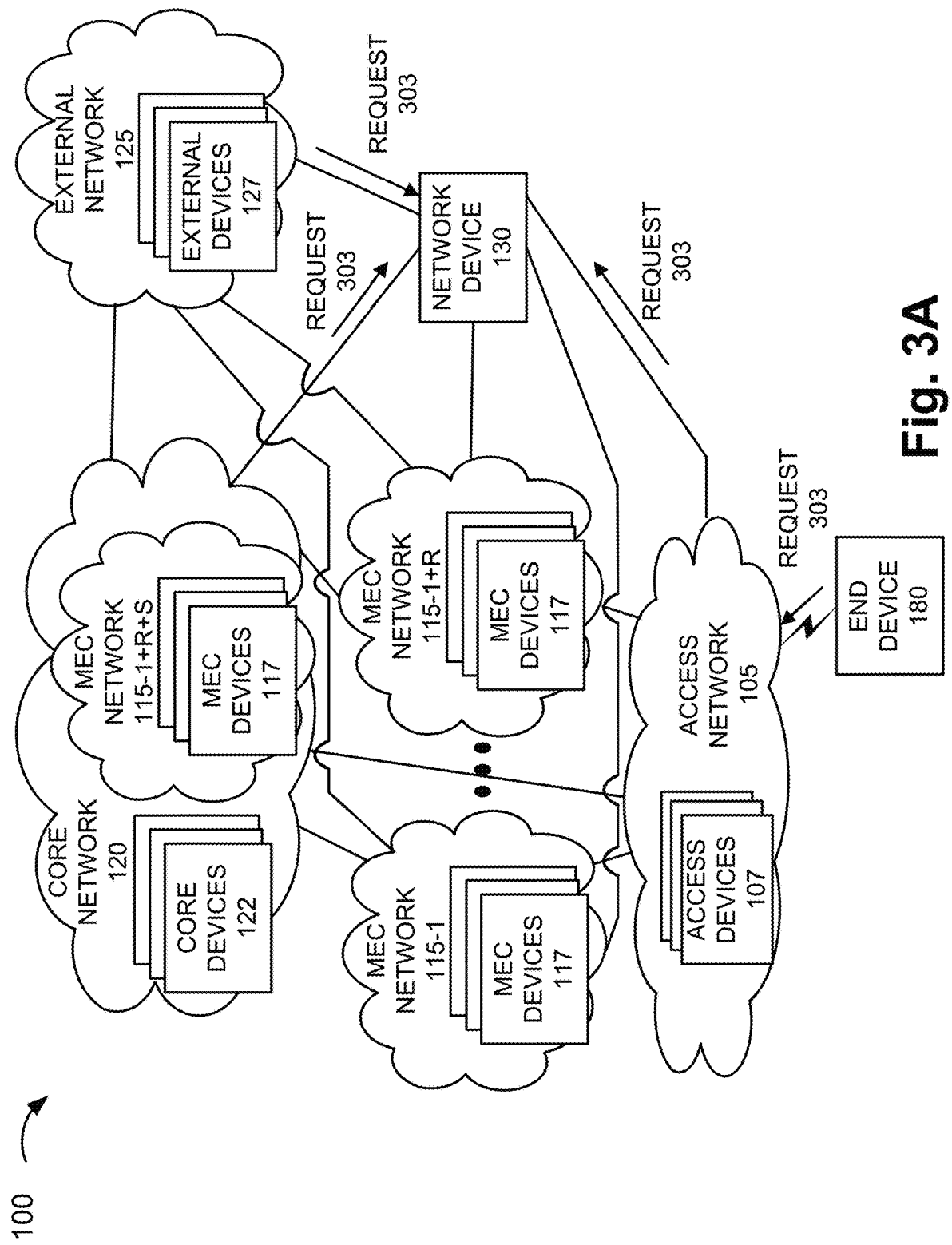

FIGS. 3A-3F are diagrams illustrating an exemplary process of the network allocation service. Referring to FIG. 3A, assume that end device 180 transmits a request 303 for an application service via access network 105, and request 303 is received by network device 130. For example, according to an exemplary scenario, network device 130 may receive request 303 from access network 105 or core network 120. According to another exemplary scenario, end device 180 may not initiate the request for the application service. For example, network device 130 may receive request 303 from external network or some other type of originating device. By way of example, request 303 may relate to a microservice or functional portion of an application service that is provisioned in external network 125.

Figure 3B:
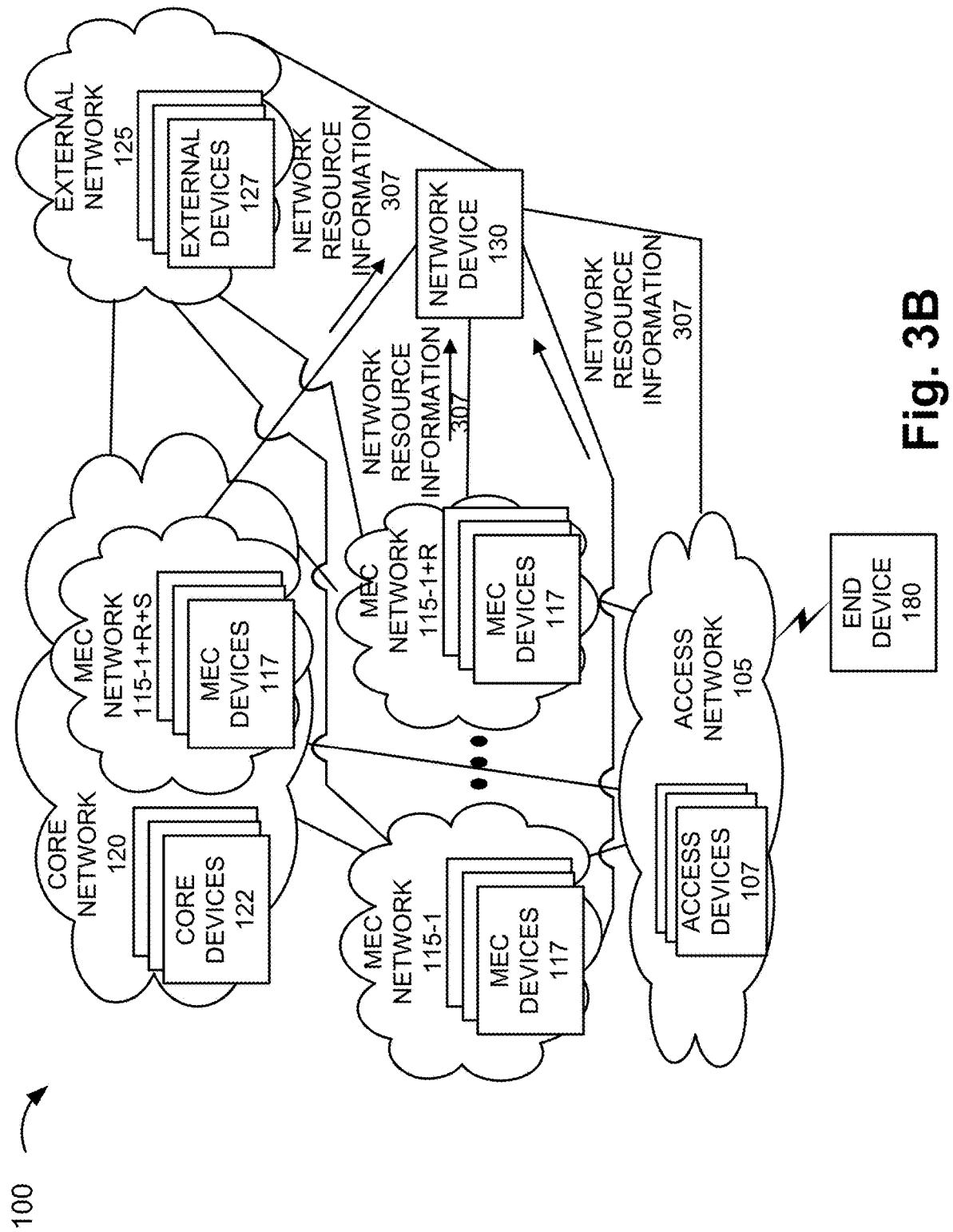
Figure 3C:
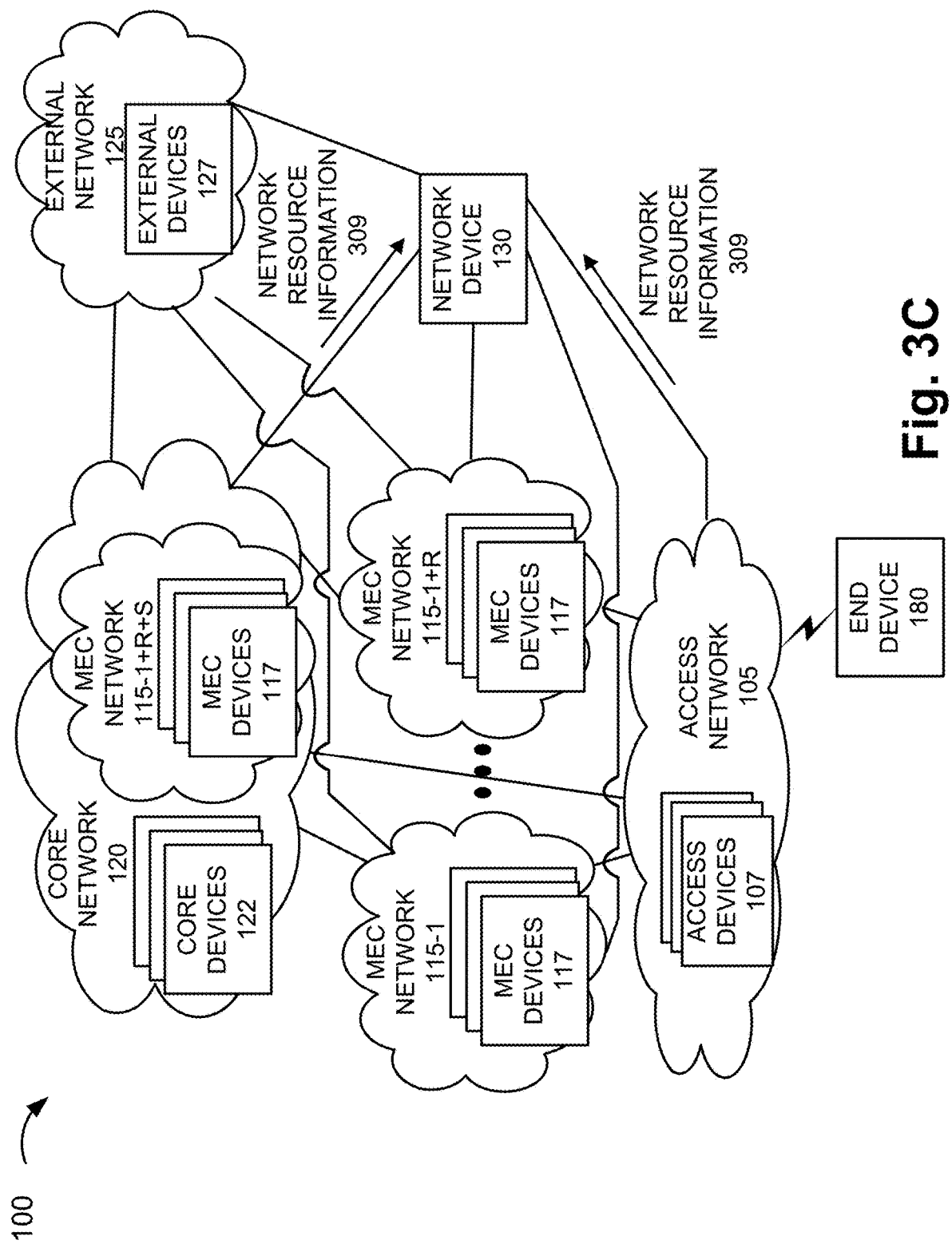

Referring to FIG. 3B, assume that proximate to this time, monitor 205 of network device 130 receives network resource information 307 from MEC networks 115. For example, network resource information 307 may indicate current utilization of MEC resources. Network resource information 307 may also indicate one or multiple identifiers (e.g., a MEC identifier, an MEC server cluster identifier, a MEC server identifier, etc.), as previously described. Additionally, for example, referring to FIG. 3C, monitor 205 of network device 130 receives network resource information 309 from access network 105 and core network 120. For example, network resource information 309 may indicate current utilization of access and core resources. According to various exemplary implementations, network device 130 may receive network resource information 307 and network resource information 309 using a push or pull method of communication.

Referring to FIG. 3D, estimator 210 of network device 130 may calculate an estimated service time value 312 based on network resource information 307, network resource information 309, application service information stored in data manager 220, and request 303. For example, estimator 210 may select the appropriate application service information based on request 303. Additionally, according to an exemplary implementation, estimator 210 may calculate an estimated service time value based on expressions (1), (3), and (5), or expressions (2), (4), and (5). According to other exemplary implementations, estimator 210 may calculate the estimated service time value and/or other estimated performance metric values relating to the application service based on the current network performance information and the application service information, or historical network performance information and the application service information, as described herein.

Figure 3E:
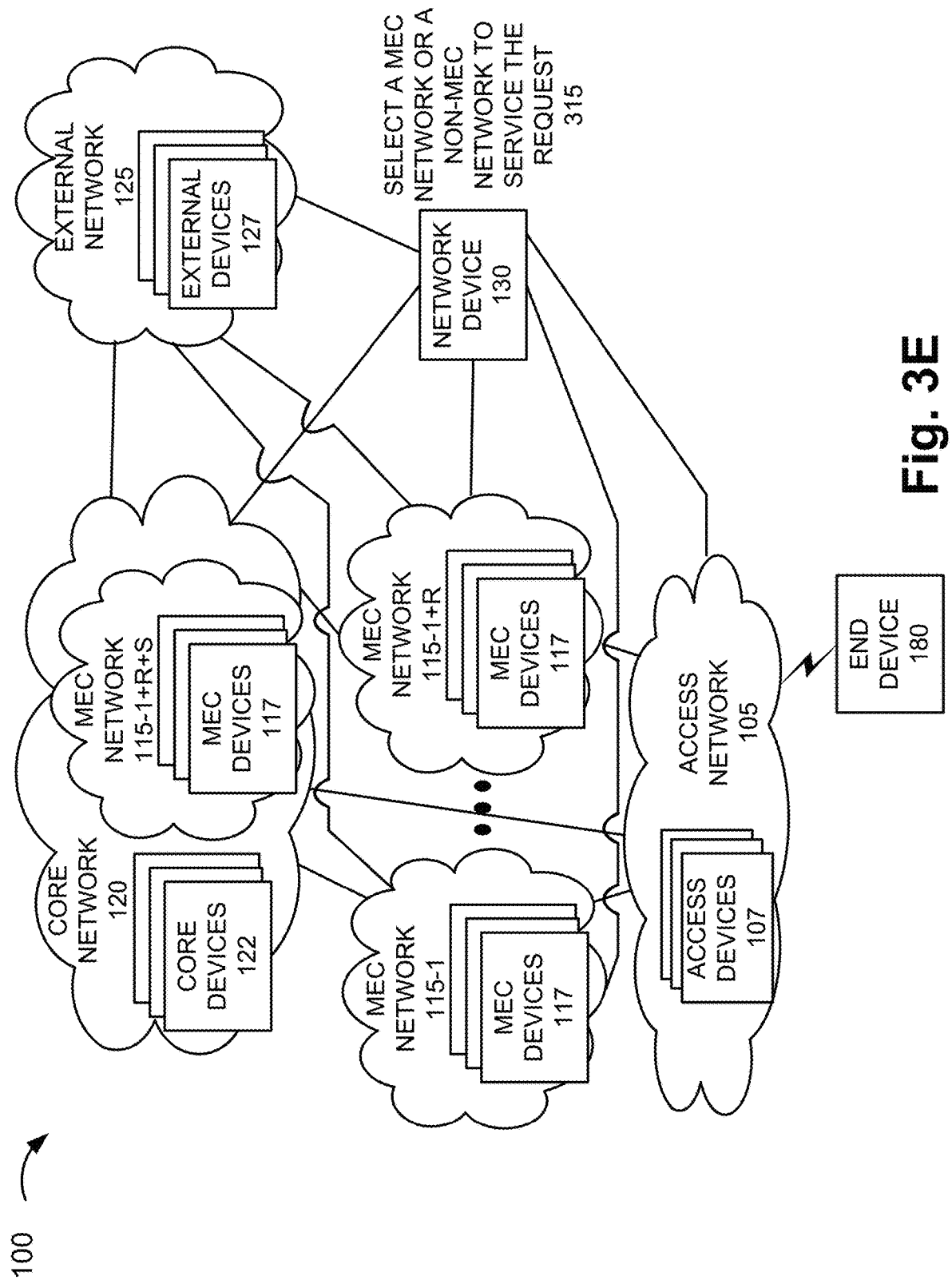
Figure 3F:
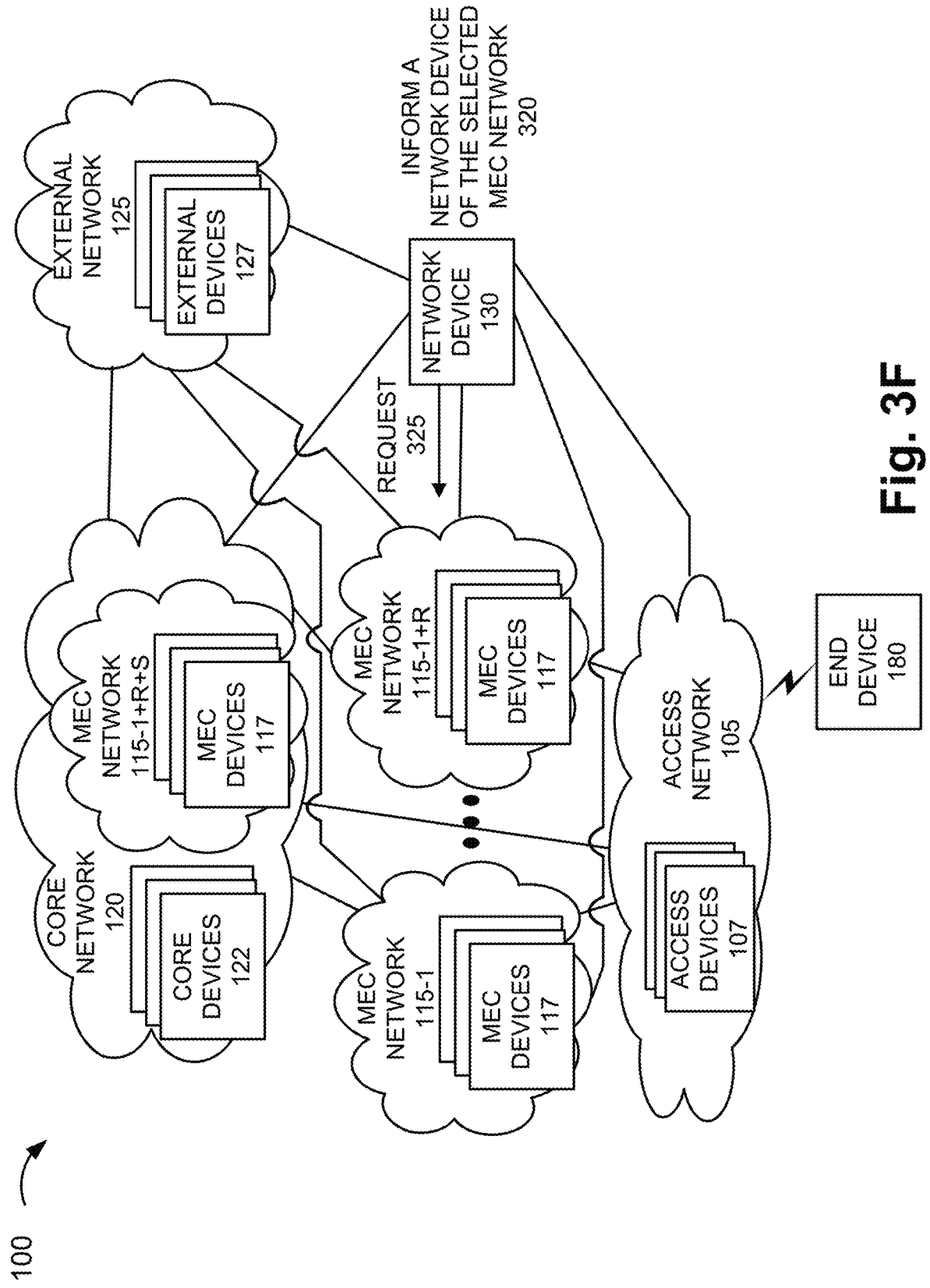

Referring to FIG. 3E, selector 215 of network device 130 may select a network to service the application service request based on the estimated service time value and/or other values provided by estimator 210 and the application service information. For example, selector 215 may determine whether MEC network 115 or a non-MEC network services the request 315. By way of further example, selector 215 may determine whether a candidate MEC network 115 satisfies performance metrics of the application service or category of the application service, as indicated in the application service information corresponding to request 303. Selector 215 may determine and select that a non-MEC network should service request 303 when there are no candidate MEC networks 115 or MEC servers that satisfy a performance metric corresponding to the estimated service time value (e.g., latency) and/or other performance metrics of the application service. As previously described, selector 215 may consider other factors in the selection or omission of selecting a candidate MEC network 115, such as preference information pertaining to the application service, least cost provisioning, load balancing, and/or other policy or rule-based considerations.

Referring to this exemplary scenario, assume that selector 215 selects MEC network 115+1+R to service the request. As illustrated in FIG. 3E, selector 215 may inform a network device of the selected MEC network 320. For example, selector 215 may transmit a request 325 to MEC network 115−1+R. Request 325 may include request 303. According to other exemplary implementations, selector 215 may inform other network devices in environment 100, as previously described. Thereafter, the application service may be provided to end device 180. According to other exemplary scenarios, selector 215 may select a non-MEC network (e.g., external network 125) to provide the application service.

FIGS. 3A-3F illustrate an exemplary process of the network allocation service, according to other exemplary embodiments, the process may include additional, different, and/or fewer steps.

FIG. 4 is a diagram illustrating exemplary components of a device 400 that may be included in one or more of the devices described herein. For example, device 400 may correspond to MEC device 117 of MEC network 115 or other types of network devices of other types of networks, as described herein. As illustrated in FIG. 10, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 10 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to MEC device 117, software 420 may include an application that, when executed by processor 410, provides a function of the network allocation service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a MEC network 115 or another type of application service layer network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
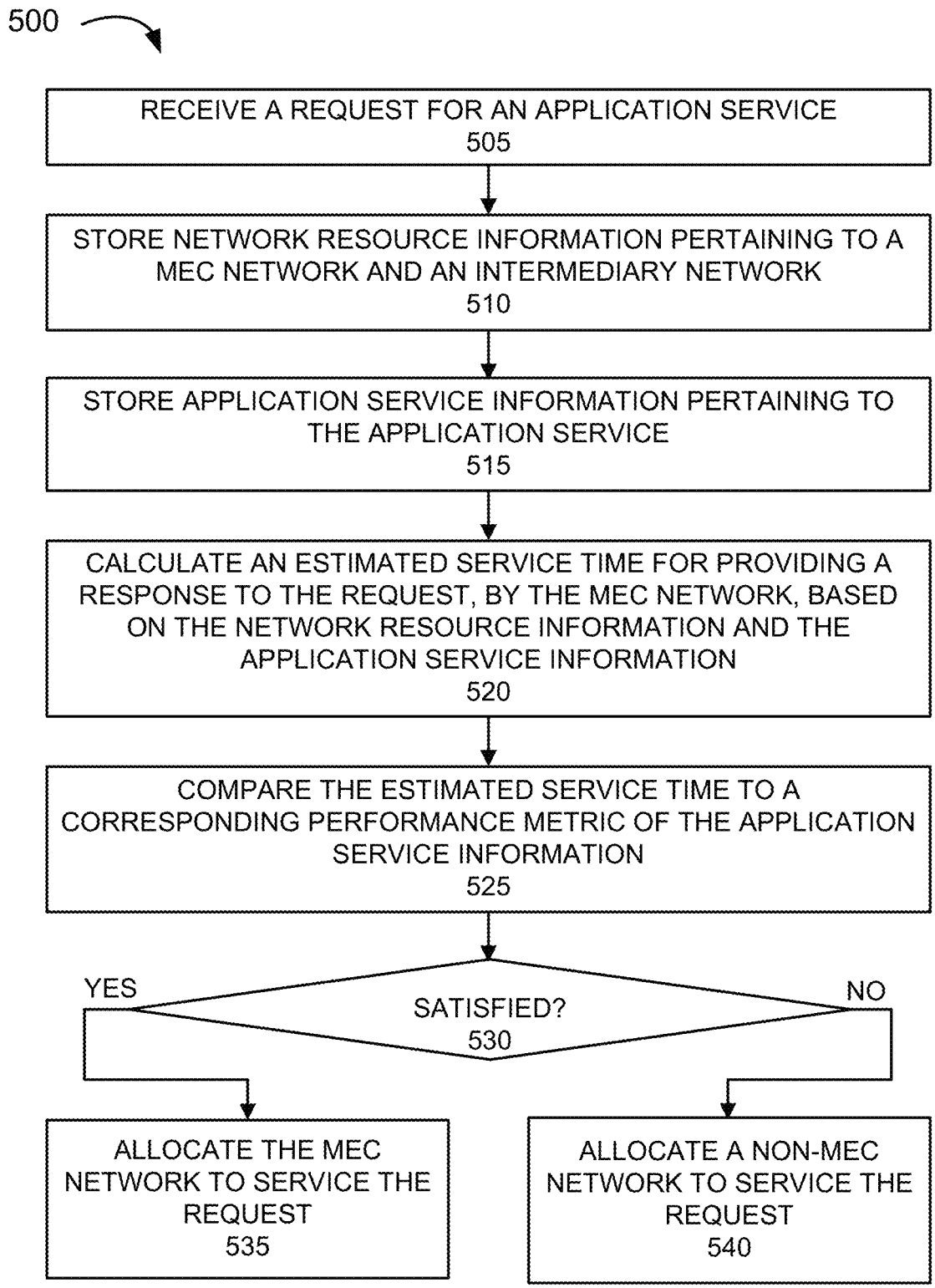
FIG. 5 is a flow diagram illustrating an exemplary process of an exemplary embodiment of the network allocation service.

FIG. 5 is a flow diagram illustrating an exemplary process 500 of an exemplary embodiment of the network allocation service. According to an exemplary embodiment, network device 130 may perform steps of process 500. According to an exemplary implementation, processor 410 executes software 420 to perform a step illustrated in FIG. 5, and described herein. Alternatively, a step illustrated in FIG. 5 and described herein, may be performed by execution of only hardware. Process 500 may be performed as an automated process.

Referring to FIG. 5, in block 505, a request for an application service may be received. For example, network device 130 may receive an application service request from end device 180 or some other network/network device.

In block 510, network resource information pertaining to MEC network and an intermediary network may be stored. For example, network device 130 may store various types of network resource information pertaining to MEC networks 115 and an intermediary network (e.g., access network 105, core network 120, etc.) that may be included in a network path between MEC network 115 and end device 180. According to various exemplary embodiments, the network resource information may include current network resource utilization data and network resource capacity data, or current network resource availability data in relation to network resources (e.g., physical, virtual, logical), as previously described.

In block 515, application service information pertaining to the application service may be stored. For example, network device 130 may store performance metric information and network resource requirement information pertaining to the application service. The application service information may also include preference information, as previously described.

In block 520, an estimated service time for providing a response to the request, by a MEC network, may be calculated based on the network resource information and the application service information. For example, network device 130 may use the network resource information and the application service information to calculate an estimated service time value based on expressions (1), (3), and (5), expressions (2), (4), and (5), or other approaches (e.g., historical network performance information, etc.), as described herein. The estimated service time may include the processing time and transit time associated with an application service response, as previously described.

In block 525, the estimated service time may be compared to a corresponding performance metric of the application service information. For example, network device 130 may compare the estimated service time value to a performance metric value of the application service (e.g., latency).

In block 530, it may be determined whether the estimated service time satisfies the performance metric of the application service. For example, network device 130 may determine whether the estimated service time of a MEC network 115 or a MEC server of MEC network 115 satisfies the performance metric of the application service based on a result of the comparison of the estimated service time value and the performance metric value.

When it is determined that the performance metric of the application service is satisfied (block 530—YES), the MEC network may be allocated to service the request (block 535). For example, network device 130 may select the MEC network 115 or the MEC server of the MEC network 115 that satisfies the performance metric of the application service. Additionally, for example, network device 130 may inform the appropriate network device for the provisioning of the application service at the selected MEC network 115, as previously described.

When it is determined that the performance metric of the application service is not satisfied (block 530-NO), a non-MEC network may be allocated to service the request (block 540). For example, when none of the MEC networks 115 or MEC servers of the MEC network 115 satisfy the performance metric of the application service, network device 130 may select a non-MEC network to service the application service request. Additionally, for example, network device 130 may inform the appropriate network devices for the provisioning of the application service at external network 125, as previously described FIG. 5 illustrates an exemplary process 500 of the network allocation service, however, according to other embodiments, process 500 may include additional operations, fewer operations, and/or different operations than those illustrated in FIG. 5, and described herein. For example, as previously described, process 500 may include a step that includes factors other than the estimated service time to determine whether to select a MEC network to service the application service request. Additionally, for example, process 500 may include obtaining and storing current network performance information pertaining to MEC network 115, intermediary networks (e.g., access network 105, etc.), or both. Network device 130 may also use the current network performance information in the selection and allocation process of MEC network 115 and a particular network path to be used for providing the application service.

According to some exemplary embodiments, as previously described, process 500 may consider performance metric values other than the service time value in the selection and allocation of a MEC network 115 or a non-MEC network. Additionally, as previously described, various types of information used by the network allocation service may or may not be stored by network device 130. For example, the various types of information (e.g., network resource information, application service information, etc.) may be stored by a network device external from network device 130.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a network device and from an originating device, a request for an application service;
   receiving, by the network device, first network resource information related to a plurality of application service layer networks of a first type comprising multi-access edge computing (MEC) networks;
   receiving, by the network device, second network resource information related to a plurality of intermediary networks in network paths connecting the MEC networks and an end device;
   calculating, by the network device in response to the receiving of the first network resource information and the second network resource information, an estimated service time value that indicates a time period for each of the network paths to provide the application service to the end device, wherein the end device differs from the originating device;
   comparing, by the network device in response to the calculating, the estimated service time value to a threshold performance metric value pertaining to the application service;
   determining, by the network device in response to the comparing, whether the threshold performance metric value is satisfied;
   selecting, by the network device when determining that the threshold performance metric value is satisfied for multiple application service layer networks of the first type, a MEC server device to provide the application service to the end device according to preference criteria associated with the application service; and
   selecting, by the network device when determining that the threshold performance metric value is not satisfied, an application service layer network of a second type to provide the application service to the end device, wherein the application service layer network of the second type is a non-MEC network.

2. The method of claim 1, wherein the time period includes an estimated processing time pertaining to the request and an application service response, by the MEC server device, and an estimated transit time of the application service response from the MEC server device to the end device.

3. The method of claim 2, wherein the calculating further comprises:
   calculating, by the network device, the estimated processing time based on a current available network resource value of the MEC server device, and a network resource processing demand value of the application service.

4. The method of claim 2, wherein the calculating further comprises:
   calculating, by the network device, the estimated transit time based on a current available network resource value of an intermediary network of the plurality of intermediary networks, and a network resource transit demand value of the application service.

5. The method of claim 4, wherein the intermediary network includes a radio access network or the radio access network and a core network, the method further comprising:
   notifying at least one of the radio access network or the core network of the selecting of the MEC server device.

6. The method of claim 1, further comprising:
   transmitting, by the network device in response to the selecting of the MEC server device, the request to the MEC server device.

7. The method of claim 1, further comprising:
   storing, by the network device, application service information pertaining to application services that include the application service, wherein the application service information includes threshold performance metric values that include the threshold performance metric value; and selecting, by the network device, the threshold performance metric value based on the request and the application service information.

8. The method of claim 1, further comprising:
transmitting, by the network device in response to the selecting of the MEC server device, a first request to provision the application service and a first notification to each of the multiple application service layer networks of the first type and to the non-MEC network; and
transmitting, by the network device in response to the selecting of the application service layer network of the second type, a second request to provision the application service and a second notification to one or more of the multiple application service layer networks of the first type.

9. A network device comprising:
a communication interface;
a memory, wherein the memory stores instructions; and
a processor, wherein the processor executes the instructions to:
receive, via the communication interface and from an originating device, a request for an application service;
receive first network resource information related to a plurality of application service layer networks of a first type comprising multi-access edge computing (MEC) networks;
receive second network resource information related to a plurality of intermediary networks in network paths connecting the MEC networks an end device;
calculate, in response to the receipt of the first network resource information and the second network resource information, an estimated service time value that indicates a time period for each of the network paths to provide the application service to the end device, wherein the end device differs from the originating device;
compare, in response to the calculation, the estimated service time value to a threshold performance metric value pertaining to the application service;
determine, in response to the comparison, whether the threshold performance metric value is satisfied;
select, when it is determined that the threshold performance metric value is satisfied for multiple application service layer networks of the first type, a MEC server device to provide the application service to the end device according to preference criteria associated with the application service; and
select, when it is determined that the threshold performance metric value is not satisfied, an application service layer network of a second type to provide the application service to the end device, wherein the application service layer network of the second type is a non-MEC network.

10. The network device of claim 9, wherein the time period includes an estimated processing time pertaining to the request and an application service response, by the MEC server device, and an estimated transit time of the application service response from the MEC server device to the end device.

11. The network device of claim 10, wherein, when calculating, the processor further executes the instructions to:
calculate the estimated processing time based on a current available network resource value of the MEC server device, and a network resource processing demand value of the application service.

12. The network device of claim 10, wherein, when calculating, the processor further executes the instructions to:
calculate the estimated transit time based on a current available network resource value of an intermediary network of the plurality of intermediary networks, and a network resource transit demand value of the application service.

13. The network device of claim 12, wherein the intermediary network includes a radio access network or the radio access network and a core network, and wherein the processor further executes the instructions to:
notify at least one of the radio access network or the core network of the selection of the MEC server device.

14. The network device of claim 9, wherein the processor further executes the instructions to:
store application service information pertaining to application services that include the application service, wherein the application service information includes threshold performance metric values that include the threshold performance metric value; and
select the threshold performance metric value based on the request and the application service information.

15. The network device of claim 9, wherein the processor further executes the instructions to:
transmit, in response to the selection of the MEC server device, a first request to provision the application service and a first notification to each of the multiple application service layer networks of the first type and to the non-MEC network; and
transmit, in response to the selection of the application service layer network of the second type, a second request to provision the application service and a second notification to one or more of the multiple application service layer networks of the first type.

16. The network device of claim 9, the processor further executes the instructions to:
transmit, via the communication interface in response to the selection of the MEC server device, the request to the MEC server device.

17. A non-transitory computer-readable storage medium storing instructions executable by a processor of a device, which when executed cause the device to:
receive a request from an originating device for an application service;
receive first network resource information related to a plurality of application service layer networks of a first type comprising multi-access edge computing (MEC) networks;
receive second network resource information related to a plurality of intermediary networks in network paths connecting the MEC networks and an end device;
calculate, in response to the receipt of the first network resource information and the second network resource information, an estimated service time value that indicates a time period for each of the network paths to provide the application service to the end device, wherein the end device differs from the originating device;
compare, in response to the calculation, the estimated service time value to a threshold performance metric value pertaining to the application service;
determine, in response to the comparison, whether the threshold performance metric value is satisfied;

select, when it is determined that the threshold performance metric value is satisfied for multiple application service layer networks of the first type, a MEC server device to provide the application service to the end device according to preference criteria associated with the application service; and select, when it is determined that the threshold performance metric value is not satisfied, an application service layer network of a second type to provide the application service to the end device, wherein the application service layer network of the second type is a non-MEC network.

18. The non-transitory computer-readable storage medium of claim 17, wherein the time period includes an estimated processing time pertaining to the request and an application service response, by the MEC server device, and an estimated transit time of the application service response from the MEC server device to the end device.

19. The non-transitory computer-readable storage medium of claim 18, wherein the instructions further comprise instructions, which when executed cause the device to:
calculate the estimated processing time based on a current available network resource value of the MEC server device, and a network resource processing demand value of the application service; and
calculate the estimated transit time based on a current available network resource value of an intermediary network of the plurality of intermediary networks, and a network resource transit demand value of the application service.

20. The non-transitory computer-readable storage medium of claim 17, wherein the instructions further comprise instructions, which when executed cause the device to:
transmit, in response to the selection of the MEC server device, a first request to provision the application service and a first notification to each of the multiple application service layer networks of the first type and to the non-MEC network; and
transmit, in response to the selection of the application service layer network of the second type, a second request to provision the application service and a second notification to one or more of the multiple application service layer networks of the first type.

* * * * *